UNITED STATES PATENT OFFICE.

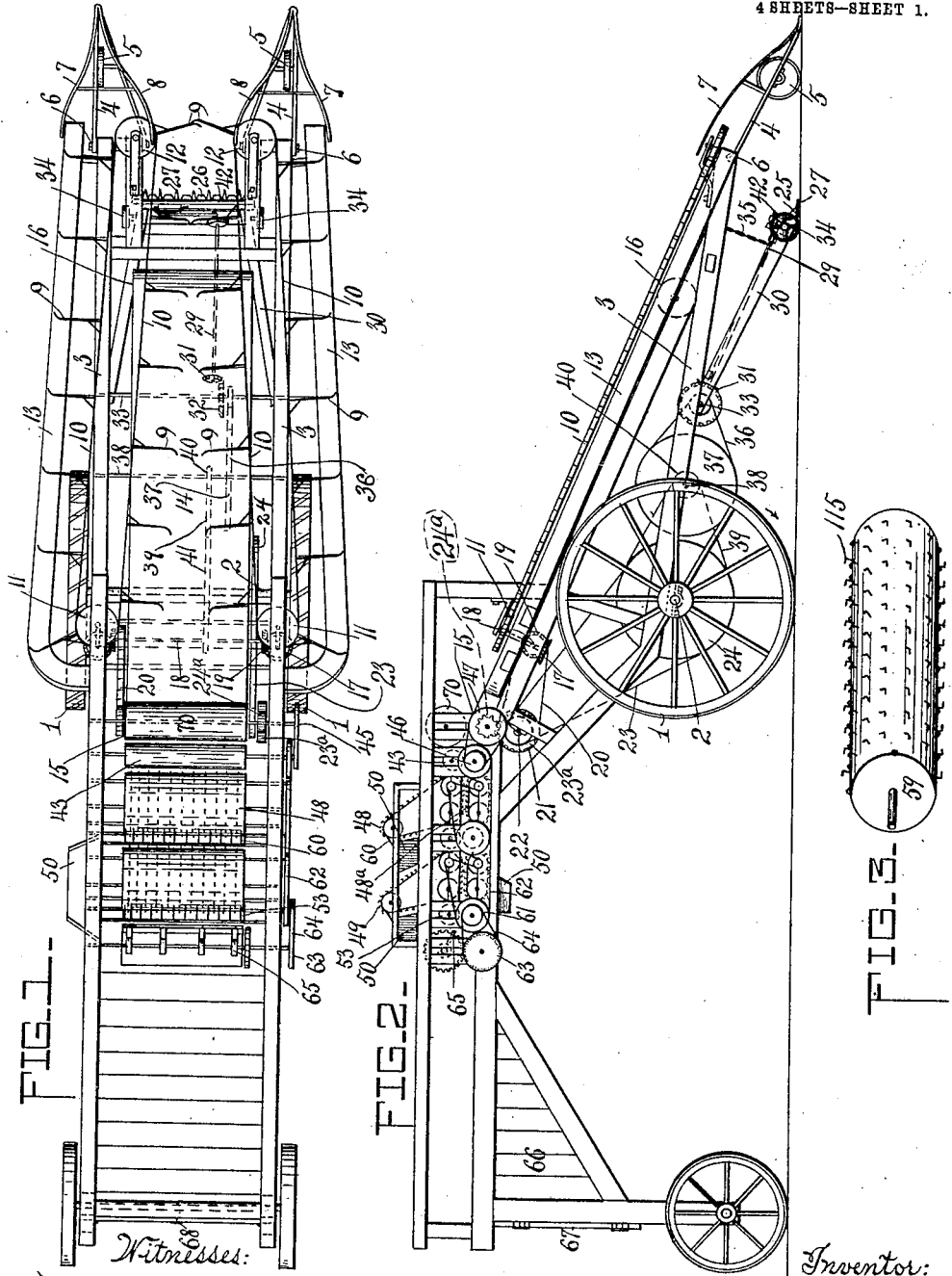

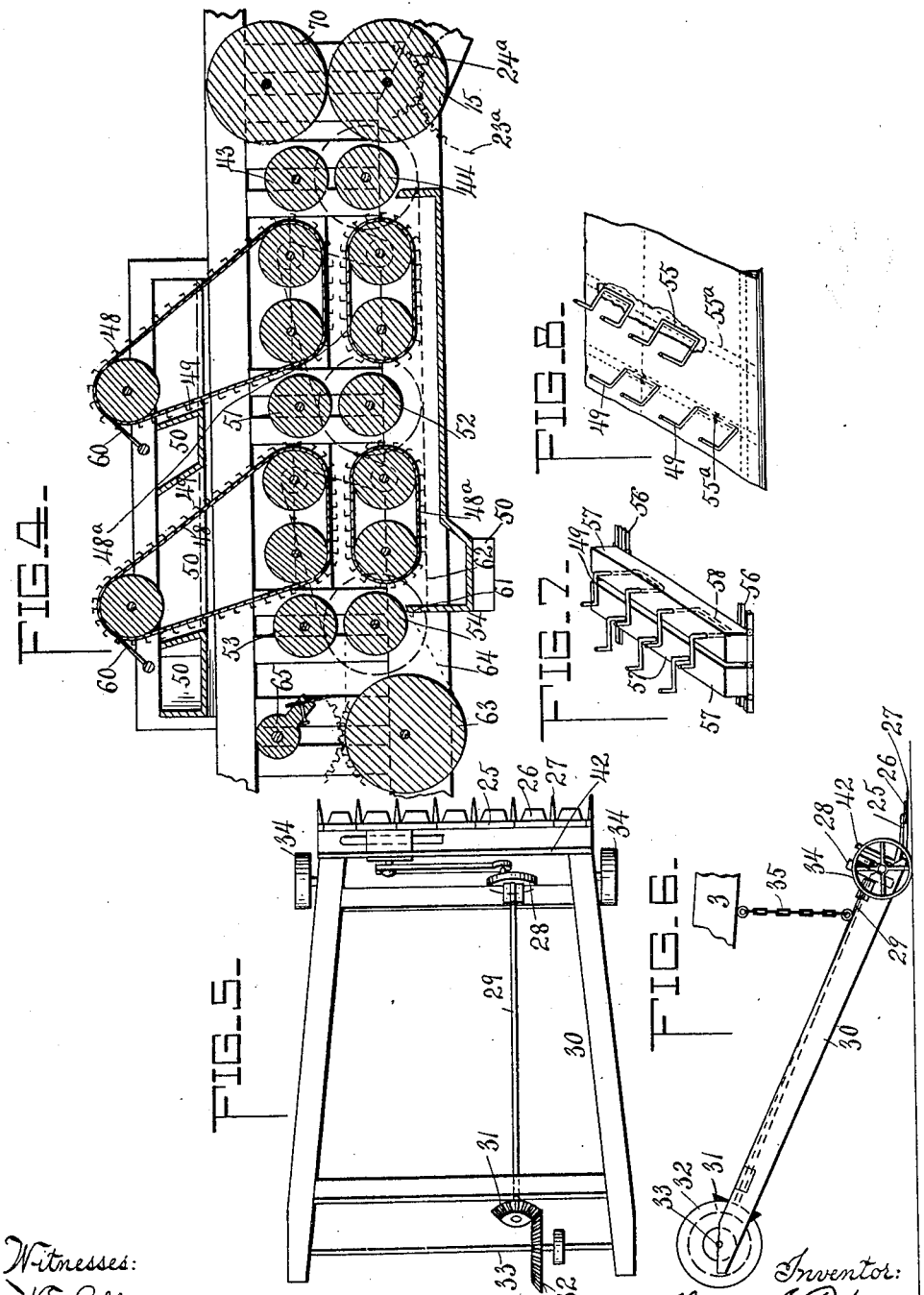

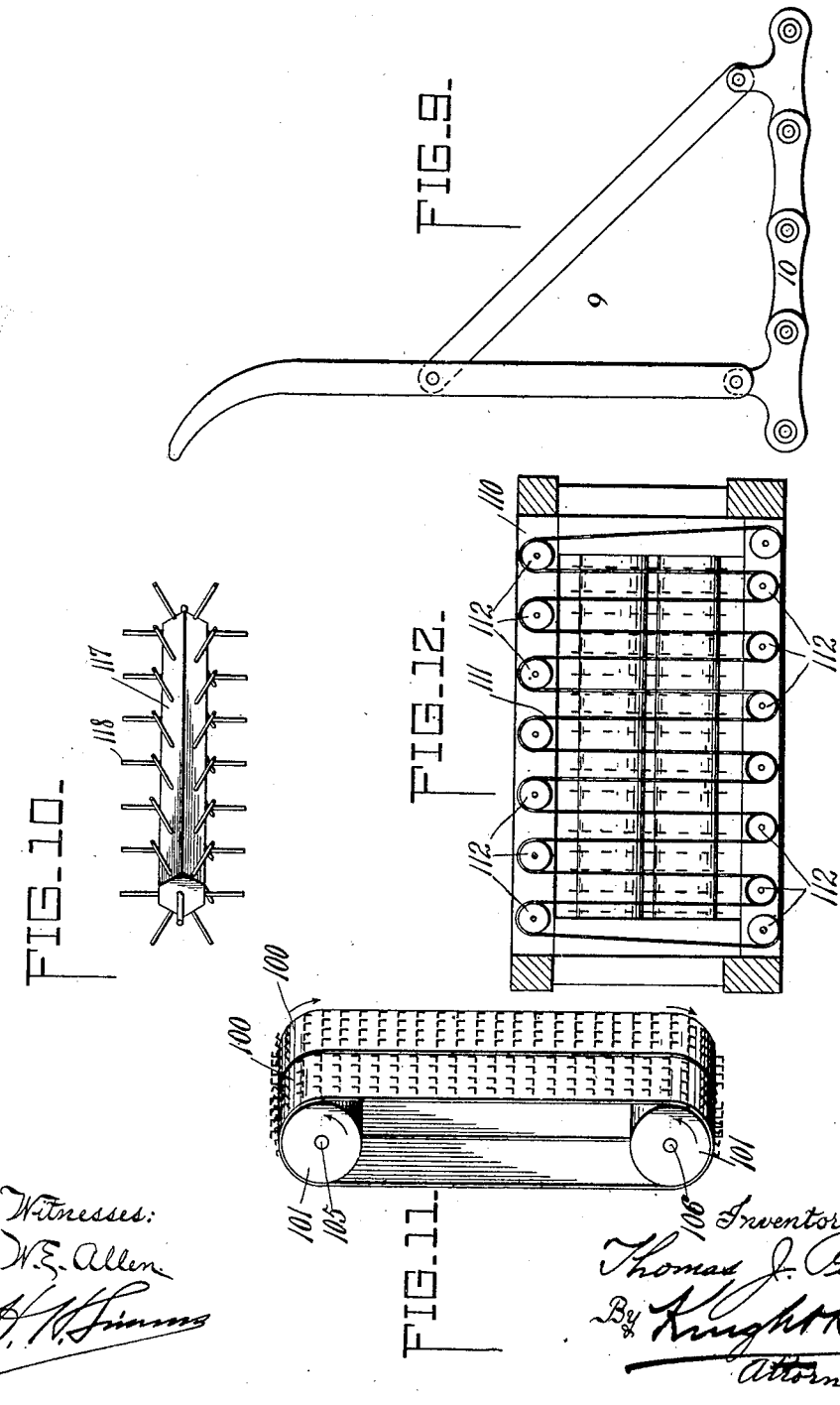

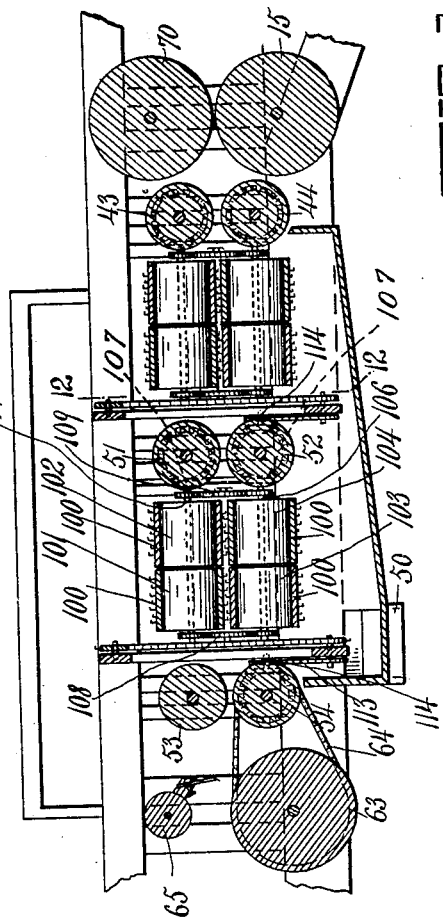

THOMAS J. PETERS, OF PERRINE, FLORIDA.

CANE-HARVESTING MACHINE.

No. 926,599.    Specification of Letters Patent.    Patented June 29, 1909.

Application filed December 26, 1906. Serial No. 349,523.

*To all whom it may concern:*

Be it known that I, THOMAS J. PETERS, a citizen of the United States, residing at Perrine, county of Dade, and State of Florida, have invented certain new and useful Improvements in Cane-Harvesting Machines, of which the following is a specification.

This invention relates to cane or stalk harvesting machines.

An object of the invention is to provide a machine which will present sugar cane or stalks to a cutting mechanism, uprighting fallen stalks or cane and will deliver the cut cane or stalks to a stripping mechanism and thence to a chopping mechanism.

Other and further objects of my invention will appear in the following description and will be more particularly pointed out in the appended claims.

In the drawings: Figure 1 is a plan view of an embodiment of my invention. Fig. 2 is a side elevation. Fig. 3 is a detail of one form of the stripping element. Fig. 4 is an enlarged vertical section of the stripping and the chopping mechanisms. Fig. 5 is a detail plan view of the cutting mechanism. Fig. 6 is a detail side view of the cutting mechanism. Fig. 7 is a detail view of a portion of one embodiment of my stripper. Fig. 8 is a detail view of still another embodiment of my stripper. Fig. 9 is a detail view of a finger for presenting the cane or stalk to the cutting mechanism. Fig. 10 is a detail perspective view of another embodiment of one of the stripping elements. Fig. 11 is a perspective view of stripping element of still another embodiment of my invention. Fig. 12 is a section on the line 12—12 Fig. 13 looking in the direction of the arrow. Fig. 13 is a longitudinal section of a portion of a machine employing the embodiment shown in Fig. 11. Fig. 14 is a longitudinal section of a portion of a machine employing the embodiment shown in Fig. 3. Fig. 15 is a longitudinal section of a portion of a machine employing the embodiment shown in Fig. 10.

Referring more particularly to the drawings 1 indicates the main traction wheels connected by an axle 2. Axle 2 supports a frame which extends forwardly and downwardly therefrom and which comprises two triangular side members 3. The forward and lower ends of said side members each carry a guard frame 4 which is provided with a caster or roller 5 and is pivoted at 6 to its side member so as to rise and fall to travel over uneven ground. Each guard frame also carries a guard formed of two diverging arms 7 and 8 respectively, the said arms being directed upwardly. These guards serve to guide the machine between the rows of cane or stalks and, at the same time should any of the stalks have fallen, they will be uprighted and directed between the two guards upon the two guard frames 4. When the cane or stalks have been in this manner bunched they are caught by two opposed fingers 9 at the lower end of the frame and presented to the cutting mechanism hereinafter to be described. These fingers shown in detail in Fig. 9 extend laterally from two endless chains 10 which pass about sprockets 11 and 12 mounted in pairs respectively near the top and the bottom of the side members 3, so that the fingers while traveling are maintained horizontally. On their downward movement the fingers travel on tracks 13 located on the outside of the side members, while upon their upward movement they travel upon an endless belt or carrier 14 arranged between the side members. Mounted upon horizontal axes at the top and bottom respectively of the side members, are pulleys or rollers 15 and 16 about which the endless carrier 14 passes upwardly and rearwardly above and downwardly and forwardly below the plane of the axes of said rollers 15 and 16. The upper sprockets 11 have bevel gears 17 connected therewith, one gear being connected with each sprocket. The bevel gears 17 are connected by a shaft 18 which carries bevel gears 19 meshing with bevel gears 17. Shaft 18 is connected by a chain 20 with a sprocket 21 on a shaft 22 which is connected by a belt 23 with a large sprocket 24 on axle 2, before mentioned. The endless carrier 14 receives motion from shaft 22 by means of a gear 23ª on the latter, meshing with a gear 24ª on the shaft of pulley 15 of the former.

The cutting mechanism hereinbefore mentioned, may be of any desired form and is arranged below the endless carrier 14 and in advance thereof. A preferred form comprises a bar 25 having fixed guard fingers 27 and a reciprocating cutter bar 26 having teeth projecting therefrom and coöperating with the guard fingers 27. The cutter bar 26 is reciprocated by means of a crank disk 28 carried by one end of a shaft 29. Shaft 29 is journaled in a swinging frame 30, being connected by bevel gear 31 with a bevel gear 32 secured to a shaft 33 about which the cutting mechanism frame 30 swings. The swinging frame 30 carries a pair of wheels 34 to maintain the cutters a proper position above the ground. It is apparent that the cutting mechanism frame may rise and fall independently of the side members 3, thus permitting the cutters to cut the stalks close to their roots upon uneven ground. To prevent the cutting mechanism entering ruts or other like depressions, the free end of the cutting mechanism frame is connected to the side members 3 by chains 35. The cutting mechanism may receive its power from any suitable source, but it is preferred to connect shaft 33 by a belt or chain 36 to a large sprocket or pulley 37 on a shaft 38, a chain or belt 39 connecting a small sprocket or pulley 40, on shaft 38 with a large sprocket or pulley 41 on axle 2.

As the cane or stalks are cut, their lower ends are engaged by a tripper bar 42 carried by the cutting mechanism frame, and this, together with the fingers 9, causes the cane or stalks to drop on the endless carrier 14 with their top toward the rear of the machine. The endless carrier, moving upwardly and toward the rear of the machine, carries the cane or stalks endwise upwardly and rearwardly, the fingers 9 serving to clamp the butt ends of the cane or stalks upon the carrier. When the cane or stalks reach the upper end of the carrier they pass beneath a roller 70 which directs them between a pair of feeding rollers 43 and 44, a chain 45 connecting a sprocket 46 on the latter with a sprocket 47 on the shaft of the pulley 15. From the feeding rolls 43 and 44 the cane or stalks pass to the stripping mechanism. The stripping mechanism comprises one or more pairs of stripping elements 48 and 48ª (two being shown) carrying hooked fingers 49. These belts moving in a direction opposite to the direction of feed of the feeding rolls 43 and 44, strip the leaves from the cane or stalks and convey the leaves to chutes 50 which discharge said leaves to one side of the machine. Should any of the leaves not be stripped by the first pair of belts 47 and 48 the cane or stalks are fed by a second pair of feed rolls 51 and 52 to a second pair of stripping belts, and from the second pair of stripping belts the cane passes to a third pair of feeding rolls 53 and 54 which deliver the cane or stalks to the chopping or cutting mechanism to be hereinafter described.

The stripping elements may be in the form of belts as shown in Figs. 1, 2 and 8 in which the belt is composed of two layers of canvas or other fabric, and fingers formed from a strip of heavy wire bent into U-shape and having deflected ends to provide the hooks. Each strip thus provides two fingers 49 which pass through one layer of the fabric and a connecting piece 55 which lies between the layers and holds the pair of fingers to the belt, the layers of the belt being sewed together on opposite sides of the piece 55ª. Instead of canvas belts, the strippers may be formed of belts as shown in Fig. 7 comprising endless chains or cables 56 connected by wooden strips 57. These wooden strips are perforated and a strip of wire is bent intermediate its ends to form a connecting member 58 and two fingers which are ⌐ shaped, the lower portion fitting in a perforation and the intermediate portion forming a spring for the extreme end portion. The strippers are cleaned by cleaning fingers 60 which are so positioned that, when the hooked or stripping fingers pass by the said cleaning fingers, any leaves on the stripping fingers are cleaned off. The stripping mechanism is driven from a pulley or sprocket 61 on feed roll 54 by means of a belt or chain 62 which connects with each stripping element in a manner to drive it in the proper direction. Both pairs of feed rolls 51, 52 and 53, 54, are also driven by the same belt or chain.

The embodiment of my invention shown in Fig. 13 and in detail in Figs. 11 and 12 is the same as in Fig. 4 except that the stripping mechanisms each comprise four endless belts 100 arranged in upper and in lower pairs and movable transversely of the direction of the feed of the stalks about pulleys 101, 102, 103 and 104 at each side of the machine. The pulleys are driven by any suitable means so that the belts of each pair move in opposite directions and the opposite belts of the two pairs also move in opposite directions. In the construction shown, shaft 105 and 106 are provided and carry bevel gears 107 which mesh with like gears on the shafts of the feed rolls in advance of the stripping mechanism. One of the pulleys of each pair of belts namely 102 and 103 are secured to the shafts 105 and 106 so as to turn therewith while the other pulleys 101 and 104 turn loosely on said shafts and are geared by idlers 108 and 109 with the opposite shaft. In this embodiment to prevent the stalks or cane being presented to the chopping mechanism in bunches, there is provided a spreading mechanism. This spreading mechanism is also adapted for any embodiment of my machine and comprises a rectangular frame 110 positioned vertically in the frame of the machine and carrying an endless chain 111 which travels about two series of sprockets 112, the two series being arranged one below and one above the line of feed of the material and the chain passing alternately about a lower and an upper sprocket. One of these sprockets has a gear carried by its shaft and meshing with a chain 113 which meshes with a stub shaft 114 geared to one of the feed rolls.

In the embodiment shown in Fig. 14 and in detail in Fig. 3, the stripping mechanisms are in the form of a pair of drums 59 having hooked fingers 115 extending therefrom. The rolls rotate in a direction opposite to the feed and are geared by chains 116 to the feed rolls. Fig. 14 has the spreading mechanism set forth in the description of Fig. 13.

In the embodiment shown in Fig. 15, the stripping mechanism comprises a pair of drums 117 having straight fingers 118 extending therefrom and geared by chains 119 to the feed rolls so as to rotate in a direction opposite to the feed.

The chopping mechanism comprises a roll 63 geared by chain 64 to the last lower feed roll 54, and a revolving knife 65 geared to the roll 63. The stalks or cane passing from the last feed rolls 53 and 54, enter between the chopping roll 63 and the knife 65. The knife cuts the stalks or cane to the desired length and the cut portions are fed rearward to a hopper or chute 66 which is closed by a door 67. This door is constructed to open automatically when the desired amount of chopped stalks or cane has been collected in the hopper, thus discharging the stalks or cane in measured piles upon the ground. For this purpose a spring latch 68 is provided and yields when a certain weight bears against the door 67. Or if desired, the operator may, when the hopper is filled, discharge the material into a wagon or other receptacle.

The machine may be propelled in any suitable manner.

Having thus described my invention what I claim as new therein is:

1. In a cane or stalk harvester, the combination with a main frame, of a pair of guard frames pivotally mounted on the main frame and provided with carrying rollers upon their forward ends, and a cutting mechanism also pivotally mounted on said main frame and arranged to cut the stalks of cane near their lower ends.

2. A cane or stalk harvester comprising a stripping mechanism, an endless carrier for conducting the cane or stalks to the stripping mechanism, and a cutting mechanism swingingly mounted to cut in advance of the carrier, and carrying a roller to travel on the ground.

3. In a cane or stalk harvester, the combination with the endless carrier; of a pair of endless belts traveling in a plane parallel to the endless carrier and in close proximity thereto; a cutting mechanism in advance of the carrier; and fingers projecting from the endless belts in such manner as to be adapted to clamp the cane or stalks between the endless carrier and said fingers.

4. A cane or stalk cutter comprising an endless carrier, a cutting mechanism mounted in advance of the front end of and below the carrier and carrying means to engage the lower ends of the stalks or cane to trip them onto the carrier, and means arranged to present the cane or stalk to the cutting mechanism and then to hold the cane or stalk flat upon the carrier.

5. In a cane or stalk harvester, the combination with the main frame provided with the traction wheels, of a cutting mechanism pivoted thereon and adapted to be driven by said traction wheels; an endless carrier driven by the traction wheels, said carrier being adapted to remove the cut cane or stalk endwise from the cutting mechanism; a stripping mechanism mounted upon the main frame and driven by said traction wheels, said stripping mechanism being adapted to receive the cane endwise from said carrier; and a chopping mechanism mounted upon the frame on an axis transverse to the endwise path of the cane and rotatably driven by said stripping mechanism, all of said mechanism being arranged symmetrically with respect to the same vertical plane.

6. In combination with a cane or stalk harvester, an inclined endless carrier, means including a plurality of fingers adapted to hold the cane lengthwise upon the endless carrier, means for bringing said fingers into coöperative relation with said carrier at the bottom of the incline and further means for removing the fingers away from the carrier at the top of the incline.

7. In a cane harvesting machine, in which the cane is fed through the machine in a direction substantially parallel to a vertical longitudinal plane through the machine, the combination with the main frame; of a cutting mechanism mounted thereon to swing about an axis transverse to the direction of movement of the cane; a stripping mechanism comprising rotating elements mounted within the frame upon axes transverse to the direction of movement of the cane; means for feeding the cut cane endwise from the cutting mechanism to the stripping mechanism; a chopping mechanism mounted upon the main frame and comprising elements rotating upon axes transverse to the path of endwise movement of the cane, said chopping mechanism being driven by the stripping mechanism; means for feeding the cane endwise from the stripping mechanism to the chopping mechanism; and a main traction wheel on the main frame connected up in driving relation with the cutting, stripping and chopping mechanism, all of said mechanism being arranged symmetrically with respect to the medial vertical plane through the machine.

8. In a cane harvesting machine, the combination with the cutting mechanism; of a mechanism for stripping and chopping the cane; an inclined endless carrier for conveying cut cane endwise from the cutting mechanism to the stripping and chopping mechanism; a pair of endless chains traveling in a plane parallel to that of the endless carrier and in close juxtaposition thereto; and a plurality of fingers projecting from each of said endless chains, all of said parts being arranged symmetrically with respect to the same vertical plane.

9. In a cane harvesting machine, the combination with a cutting mechanism and the inclined endless carrier for conveying cut cane therefrom, of a pair of endless chains traveling in a plane parallel to that of the endless carrier, and in close juxtaposition thereto a plurality of fingers carried by said endless chains and finger supporting tracks also in a plane parallel to that of the carrier and one on each side thereof, said fingers being adapted to travel over the carrier in one direction and upon the tracks during their movement in the opposite direction.

10. In a cane harvesting machine, the combination with a cutting mechanism, of a mechanism for stripping and chopping the cane, an inclined endless carrier for conveying cut cane from the cutting mechanism to the stripping and chopping mechanism, and a pair of endless chains traveling in a plane parallel to that of the endless carrier and in close proximity thereto, and having fingers projecting therefrom.

11. In a cane harvesting machine provided with a main traction wheel, the combination with the cutting mechanism; of a stripping and chopping mechanism; an inclined endless carrier having means for clamping the cut cane lengthwise thereon and moving between the cutting and stripping mechanisms in such manner as to present the cane endwise to the latter; and means for driving the several parts from said main traction wheel, all of said parts being coöperatively adapted to feed the stalks endwise through the machine without lateral deviation.

The foregoing specification signed at Miami, Fla., this 4th day of September, 1906.

THOMAS J. PETERS.

In presence of two witnesses:
 J. W. HORNER,
 L. TERRYBERRY.